United States Patent
Dean et al.

[11] Patent Number: 6,105,100
[45] Date of Patent: Aug. 15, 2000

[54] METHOD AND APPARATUS FOR DETECTING AND INITIALIZING THE ADDITION OF A NEW CLIENT MACHINE IN A NETWORK

[75] Inventors: Jeffrey Randell Dean; Ingrid Milagros Rodriquez, both of Austin, Tex.

[73] Assignee: International Business Machines Corporation, Armonk, N.Y.

[21] Appl. No.: 09/118,556

[22] Filed: Jul. 17, 1998

[51] Int. Cl.[7] .................................................. G06F 13/22
[52] U.S. Cl. .................. 710/220; 709/224; 709/222; 709/203
[58] Field of Search ........................... 710/220; 370/346, 370/449; 709/224, 222, 203

[56] References Cited

U.S. PATENT DOCUMENTS

| | | | |
|---|---|---|---|
| 5,565,908 | 10/1996 | Ahmad | 709/219 |
| 5,859,852 | 1/1999 | Moura et al. | 370/449 |
| 5,987,430 | 11/1999 | Van Horne et al. | 705/34 |
| 6,005,850 | 12/1999 | Moura et al. | 370/282 |
| 6,012,088 | 1/2000 | Li et al. | 709/219 |

*Primary Examiner*—Kenneth R. Coulter
*Attorney, Agent, or Firm*—Leslie A. Van Leeuwen; Richard A. Henkler

[57] ABSTRACT

A method and apparatus for detecting and initializing the addition of a new client machine to a network while requiring only minimal intervention by an individual. The above is accomplished by using the unique network adapter addresses, for each client of the network, to determine whether or not existing client machines are operative, as well as the addition of a new client machine to the network. Upon the detection of the addition of a new client machine, the new client machine is initialized using profiles and templates to default parameters, and is fully operative with minimal interaction by an individual.

15 Claims, 4 Drawing Sheets

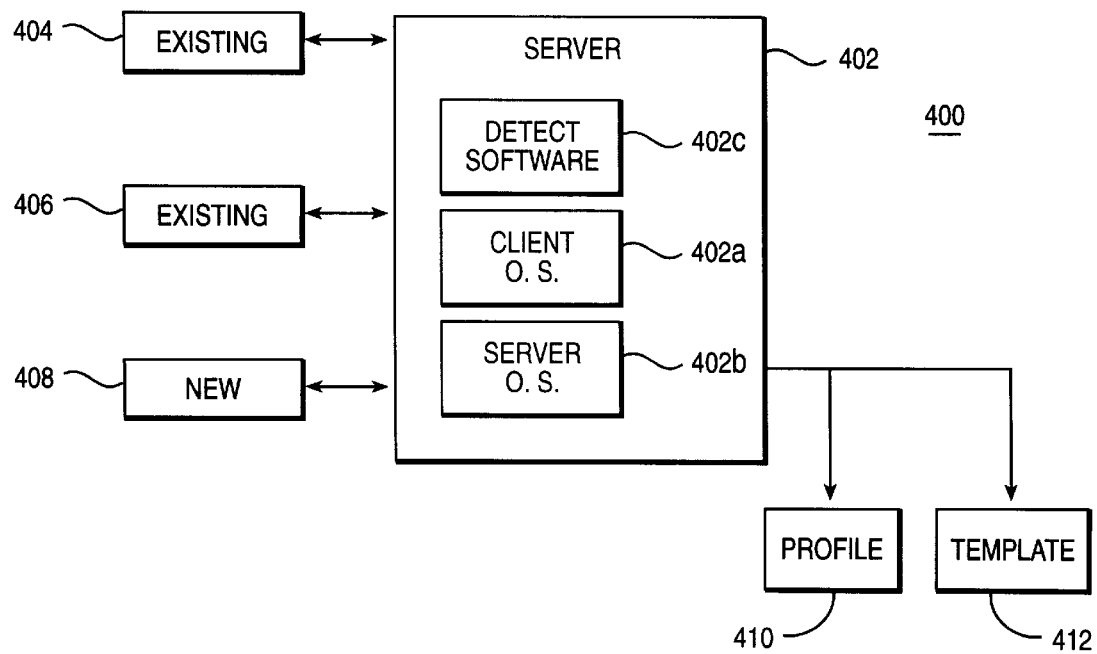

CLIENT TABLE 302

| MAC ADDRESS | MACHINE |
|---|---|
| 1 | 404 |
| 2 | 406 |
|  |  |

302c
302d

METHOD AND APPARATUS FOR DETECTING AND INITIALIZING THE ADDITION OF A NEW CLIENT MACHINE IN A NETWORK

CROSS-REFERENCE TO RELATED APPLICATIONS

The present patent application is related to Ser. No. 09/118/209 entitled "METHOD AND APPARATUS FOR ALLOWING A USER TO ROVE AMONG VARIOUS CLIENTS IN A NETWORK WHILE MAINTAINING INDIVIDUAL HARDWARE AND SOFTWARE PREFERENCES".

The present patent application is related to Ser. No. 09/118/211 entitled "SIMPLIFIED SETTING UP OF A NETWORK OF A SERVER COMPUTER PRELOADED WITH ALL COMPUTER PROGRAMS REQUIRED BY A GROUP OF CLIENT COMPUTERS TO BE CONNECTED INTO NETWORK".

The present patent application is related to Ser. No. 09/118/559 entitled "SYSTEM AND METHOD FOR CREATION OF A NETWORK COMPUTING ENVIRONMENT".

The present patent application is related to Ser. No. 09/118/208 entitled "CONFIGURING COMPUTER NETWORK OPERATIONS BASED UPON THE CORRELATION OF A SEQUENCE OF INTERACTIVE DISPLAY USER ENTRIES APPARENTLY UNRELATED TO COMPUTER OPERATIONS".

The present patent application is related to Ser. No. 09/118/557 entitled "DATA PROCESSING SYSTEM, METHOD, AND PROGRAM PRODUCT FOR AUTOMATING ACCOUNT CREATION IN A NETWORK".

The present patent application is related to Ser. No. 09/118/293 entitled "COMPUTER SOFTWARE SYSTEM FOR ELIMINATING OPERATING-SYSTEM MULTIPLE LOGINS UNDER REMOTE PROGRAM LOAD WITH NETWORK PROVIDER DYNAMIC LINK LIBRARY".

The present patent application is related to Ser. No. 09/118/210 entitled "CONFIGURING COMPUTER NETWORK OPERATIONS BASED UPON A SEQUENCE OF INTERACTIVE USER ENTRIES INTO A NETWORK SERVER COMPUTER WITH A ONE TIME ENTRY OF DATA COMMONLY REQUIRED BY MULTIPLE CLIENTS".

The present patent application is related to Ser. No. 09/118/560 entitled "NETWORK WITH STORAGE OF ALL CLIENT COMPUTER PROGRAMS IN SERVER COMPUTER HAVING CUSTOMIZED CLIENT GRAPHICAL USER INTERFACES WITH MAXIMUM SHARING OF STORED PORTIONS OF INTERFACES COMMON TO A PLURALITY OF CLIENTS"

The present patent application is related to Ser. No. 09/118/292 entitled "SERVER AND COMPUTER NETWORK THAT PERMIT A CLIENT TO BE EASILY INTRODUCED INTO THE COMPUTER NETWORK".

The present patent application is related to Ser. No. 09/118/207 entitled "METHOD AND APPARATUS FOR CREATING A PRELOAD IMAGE".

The present patent application is related to Ser. No. 09/118/558 entitled "METHOD AND APPARATUS FOR ALLOWING A USER TO ROVE AMONG VARIOUS CLIENTS IN A NETWORK WHILE MAINTAINING INDIVIDUAL HARDWARE PREFERENCES".

The present patent application is related to Ser. No. 09/118/555 entitled "AUTOMATIC CLEANUP OF USER DATA IN A NETWORK ENVIRONMENT".

BACKGROUND

1. Technical Field of the Present Invention

The present invention generally relates to computer networks, and more specifically, to methods and apparatuses that detect and initialize the addition of a new client machine in a network.

2. Background of the Invention

Computers and their application programs are used in all aspects of business, industry and academic endeavors. In recent years, there has been a technological evolution driven by the convergence of the data processing industry with the consumer electronics industry. This advance has been even further accelerated by the extensive consumer and business involvement in the Internet in recent years. As a result of these changes, it seems as if virtually all aspects of human productivity in the industrialized world requires human/computer interaction. The computer industry has been a force for bringing about great increases in business and industrial productivity. Almost every week seems to bring computer industry advances which promise even further increases in productivity. These advances offer to drive down business and industry costs and increase efficiency in addition to increasing productivity. In addition, the cost of "computer power" continues to drop as result of rapid advances in computer related technologies.

Despite all these advantages, there still remains great resistance in all industries and business fields to new computer systems and significant system upgrades which offer much in productivity increases. This resistance results from past experience which equates installing new computer systems or significant upgrades in existing systems with large amounts of downtime, during which the business, manufacturing facility or individual worker functions or operate at diminished levels.

When a business or production facility is trying to decide whether to install a new or significantly upgraded computer system, the concern about downtime, the possible loss of business, as well as stress on the workers involved, very often out weighs the cost of the installation in influencing the decision. The concern about business and production delays resulting from installation has become so great that fewer and fewer small businesses are trying to make system and program changes on their own.

The professional computer service industry which carries out and supports installations and upgrades in the business and industrial sector has been rapidly expanding over the past decade. However, even with such computer professional support, the threat of such downtime coupled with the cost of such professional services caused by installation delays remains of great concern. This is especially true when the demands put on a current network environment requires additional clients.

It would, therefore, be a distinct advantage to have a method and apparatus that would automatically, and without intervention by a skilled administrator, detect the addition of a new client machine to the network, and completely initialize the new client machine to be completely operative with minimal interaction by an individual. The present invention provides such a method and apparatus.

SUMMARY OF THE PRESENT INVENTION

The present invention is a method and apparatus for detecting and initializing he addition of a new client machine to a network while requiring only minimal intervention by an individual. The above is accomplished by using the unique network adapter addresses, for each client of the network, to determine whether or not existing client machines are operative, as well as the addition of a new client machine to the network. Upon the detection of the addition of a new client machine, the new client machine is initialized using profiles and templates to default parameters, and is fully operative with minimal interaction by an individual.

BRIEF DESCRIPTION OF THE DRAWINGS

The present invention will be better understood and its numerous objects and advantages will become more apparent to those skilled in the art by reference to the following drawings, in conjunction with the accompanying specification, in which:

FIG. 3 is a diagram illustrating a client table which is used to detect the addition of new client machines such as the computer system of FIG. 1 to a network according to the teachings of the present invention;

FIG. 4 is a diagram illustrating a simplistic network which can be used in accordance with the teachings of the preferred embodiment of the present invention;

DETAILED DESCRIPTION OF THE PREFERRED EMBODIMENT OF THE PRESENT INVENTION

In the following description, numerous specific details are set forth such as specific word or byte lengths, etc., to provide a thorough understanding of the present invention. However, it will be obvious to those of ordinary skill in the art that the present invention can be practiced without such specific details.

Figure 1:
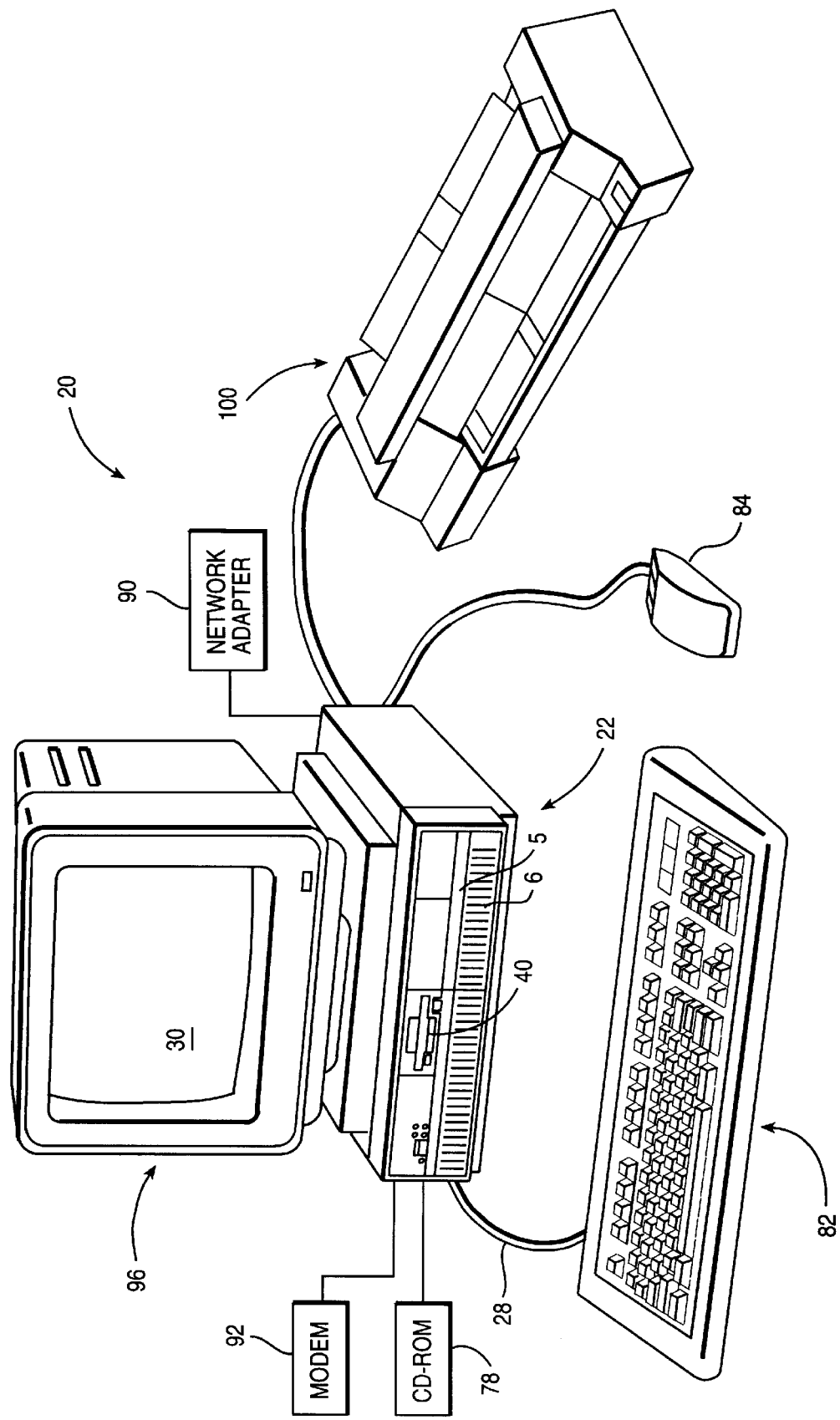
FIG. 1 is a diagram illustrating a data processing system in which the present invention can be practiced.

Reference now being made to FIG. 1, a data processing system 20 is shown in which the present invention can be practiced. The data processing system 20 includes processor 22, keyboard 82, and display 96. Keyboard 82 is coupled to processor 22 by a cable 28. Display 96 includes display screen 30, which may be implemented using a cathode ray tube (CRT) a liquid crystal display (LCD) an electrode luminescent panel or the like. The data processing system 20 also includes pointing device 84, which may be implemented using a track ball, a joy stick, touch sensitive tablet or screen, track path, or as illustrated a mouse. The pointing device 84 may be used to move a pointer or cursor on display screen 30. Processor 22 may also be coupled to one or more peripheral devices such as modem 92, CD-ROM 78, network adapter 90, and floppy disk drive 40, each of which may be internal or external to the enclosure or processor 22. An output device such as printer 100 may also be coupled with processor 22.

It should be noted and recognized by those persons of ordinary skill in the art that display 96, keyboard 82, and pointing device 84 may each be implemented using anyone of several known off-the-shelf components.

Figure 2:
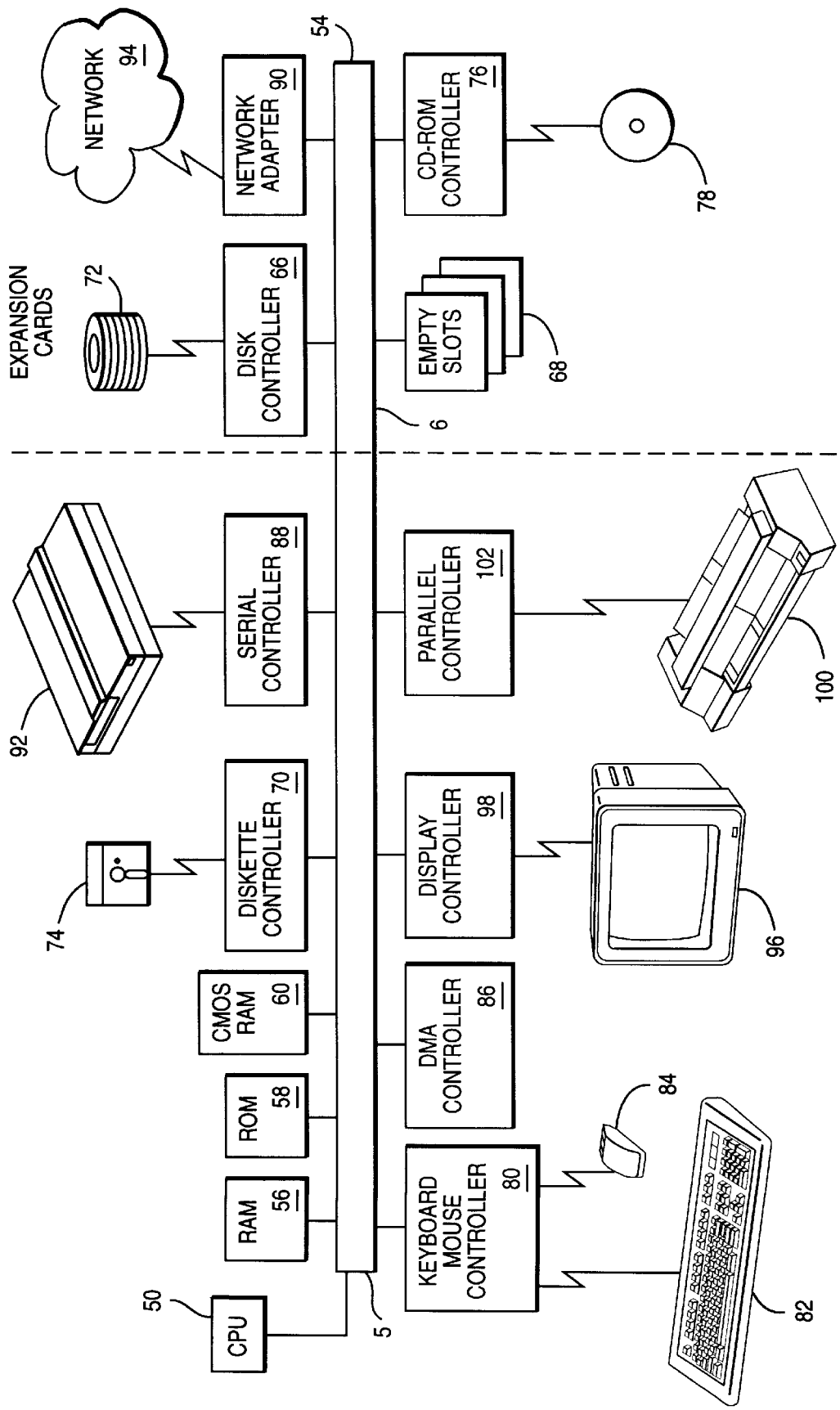
FIG. 2 is a high level block diagram illustrating select components that can be included in the data processing system of FIG. 1 according to the teachings of the present invention.

Reference now being made to FIG. 2, a high level block diagram is shown illustrating selected components that can be included in the data processing system 20 of FIG. 1 according to the teachings of the present invention. The data processing system 20 is controlled primarily by computer readable instructions, which can be in the form of software, wherever, or by whatever means such software is stored or accessed. Such software may be executed within the Central Processing Unit (CPU) 50 to cause data processing system 20 to do works Memory devices coupled to system bus 5 include Random Access Memory (RAM) 56, Read Only Memory (ROM) 58, and non-volatile memory 60. Such memories include circuitry that allows information to be stored and retrieved. ROMs contain stored data that cannot be modified. Data stored in RAM can be changed by CPU 50 or other hardware devices. Non-volatile memory is memory that does not loose data when power is removed from it. Non-volatile memories include ROM, EPROM, flash memory, or battery-pack CMOS RAM. As shown in FIG. 2, such battery-pack CMOS RAM may be used to store configuration information.

An expansion card or board is a circuit board that includes chips and other electronic components connected that adds functions or resources to the computer. Typically expansion cards add memory, disk-drive controllers 66, video support, parallel and serial ports, and internal modems. For lop top palm top, and other portable computers, expansion cards usually take the form of PC cards, which are credit card-sized devices designed to plug into a slot in the side or back of a computer. An example such a slot is PCMCIA slot (Personal Computer Memory Card International Association) which defines type 1, 2 and 3 card slots. Thus, empty slots 68 may be used to receive various types of expansion cards or PCMCIA cards.

Disk controller 66 and diskette controller 70 both include special purpose integrated circuits and associated circuitry that direct and control reading from and writing to hard disk drive 72, and a floppy disk or diskette 74, respectively. Such disk controllers handle task such as positioning read/write head, mediating between the, rive and the CPU 50, and controlling the transfer information to and from memory. A single disk controller may be able to control more than one disk drive.

CD-ROM controller 76 may be included in data processing 20 for reading data from CD-ROM 78 (compact disk read only memory). Such CD-ROMs use laser optics rather then magnetic means for reading data.

Keyboard mouse controller 80 is provided in data processing system 20 for interfacing with keyboard 82 and pointing device 84. Such pointing devices are typically used to control an on-screen element, such as a cursor, which may take the form of an arrow having a hot spot that specifies the location of the pointer when the user presses a mouse button. Other pointing devices include the graphics tablet, the stylus, the light pin, the joystick, the puck, the trackball, the trackpad, and the pointing device sold under the trademark "TrackPoint" by IBM.

Communication between processing system 20 and other data processing systems may be facilitated by serial controller 88 and network adapter 90, both of which are coupled to system bus 5. Serial controller 88 is used to transmit information between computers, or between a computer and peripheral devices, one bit at a time over a single line. Serial communications can be synchronous (controlled by some standard such as a clock) or asynchronous (managed by the exchange of control signals that govern the flow of information). Examples of serial communication standards include RS-232 interface and the RS-422 interface. As illustrated, such a serial interface may be used to communicate with modem 92. A modem is a communication device that enables a computer to transmit information over a standard telephone line. Modems convert digital computer signals to interlock signals suitable for communications over telephone lines, Modem 92 can be utilized to connect data processing system 20 to an on-line information service, such as an information service provided under the service mark "PRODIGY" by IBM and Sears. Such on-line service providers may offer software that may be down loaded into data processing system 20 via modem 92. Modem 92 may provide a connection to other sources of software, such as server, an electronic bulletin board, the Internet or World Wide Web.

Network adapter 90 may be used to connect data processing system 20 to a local area network 94. Network 94 may provide computer users with means of communicating and transferring software and information electronically. Additionally, network 94 may provide distributed processing, which involves several computers in the sharing of workloads or cooperative efforts in performing a task.

Display 96, which is controlled by display controller 98, is used to display visual output generated by data processing system 20. Such visual output may include text, graphics, animated graphics, and video. Display 96 may be implemented with CRT-based video display, an LCD-based flat panel display, or a gas plasma-based flat-panel display. Display controller 98 includes electronic components required to generate a video signal that is sent to display 96.

Printer 100 may be coupled to data processing system 20 via parallel controller 102. Printer 100 is used to put text or a computer-generated image on paper or on another medium, such as transparency. Other type of printers may include an image setter, a plotter, or a film recorder.

Parallel controller 102 is used to send multiple data and control bits simultaneously over wires connected between system bus 5 and another parallel communication device, such as printer 100.

CPU 50 fetches, decodes, and executes instructions, and transfers information to and from other resources via the computers main data-transfer path, system bus 5. Such a bus connects the components in a data processing system 20 and defines the medium for data exchange. System bus S connects together and allows for the exchange of data between memory units 56, 58, and 60, CPU 50, and other devices as shown in FIG. 2.

Reference now being made to FIG. 3, a diagram is shown illustrating a client table 302 which is used to detect the addition of new client machines, such as the computer system 100 of FIG. 1 to a network, according to the teachings of the present invention. As previously stated, current methods used to identify the addition of a new client machine to a network have required a skilled administrator to define the user who will use the new client machine using a user name defined by the server (e.g. PC Server), and then to configure the new client machine to have a computer name which is the same as that of the user name defined at the server. In addition, various other non-trivial tasks are also required by the administrator to initialize the new client. The above noted process is manual, time consuming, and requires technical skills beyond those of a typical small business consumer.

In the preferred embodiment of the present invention, a client table 302 is maintained for defining the client machines of the entire network. More specifically, the client table 302 contains a network adapter address (MAC address), which is unique to each network adapter and each client, and the name of the client machine containing the network adapter.

Reference now being made to FIG. 4, a diagram is shown illustrating a simplistic network environment 400 which can be used in accordance with the teachings of the preferred embodiment of the present invention. As noted, the network 400 includes two previous existing client machines 404 and 406, and in this particular example, the user is attempting to add a new client machine 408.

The network 400 also includes a server 402 having client operating system software 402a, server operating system software 402b, and detection software 402c. The detection software 402c is used for detecting when either an existing client machine 404 or 406 fails, or when a new client machine, such as new client machine 408, has been added to the network 400.

As each client 404 and 406 is booted, they are logged on to server 402, and the client operating system 402a is shared with both clients 402 and 404 using a technology referred to as "Remote Program Load" (RPL) which is well understood by those skilled in the art, and therefore, further discussion of RPL is deemed unnecessary.

In the preferred embodiment of the present invention, the client operating system 402a is the Windows 95™ Operating System produced by Microsoft Corporation, and the server operating system 402b is the Windows NT™ Operating System produced by Microsoft Corporation.

Assuming for the moment, that a user is attempting to add a new client machine 408 to the existing network 400. After all the necessary applicable hardware connections have been performed, the new client machine 408 is turned on, and the detection software 402c detects that a new MAC address now exists on the network 400.

This is accomplished by the detection software 402c periodically polling all clients 404–408 of the network 400 to determine whether they are active or a new client machine has been added. In this particular example, the detection software 402c has previously detected and recorded the MAC addresses for client machines 404 and 406.

Upon detecting the MAC address of the new client machine 408, the detection software adds the new MAC address to the client table 302. In this example, it can be assumed that clients 404 and 406 have MAC addresses 1 and 2, and are recorded as entries 302c and 302d of client table 302 of FIG. 5.

After entering the new MAC address and new client machine identification into the client table 302, the detection software 402c then uses a pre-selected profile 410 in combination with pre existing templates 412 to initialize the new client machine 408 to default parameters. The pre-selected profile 410 contains information which is network adapter specific. The pre existing templates 412 include information concerning the client's 408 directory structure for specific locations of files, such as applications.

Figures 5, 6:
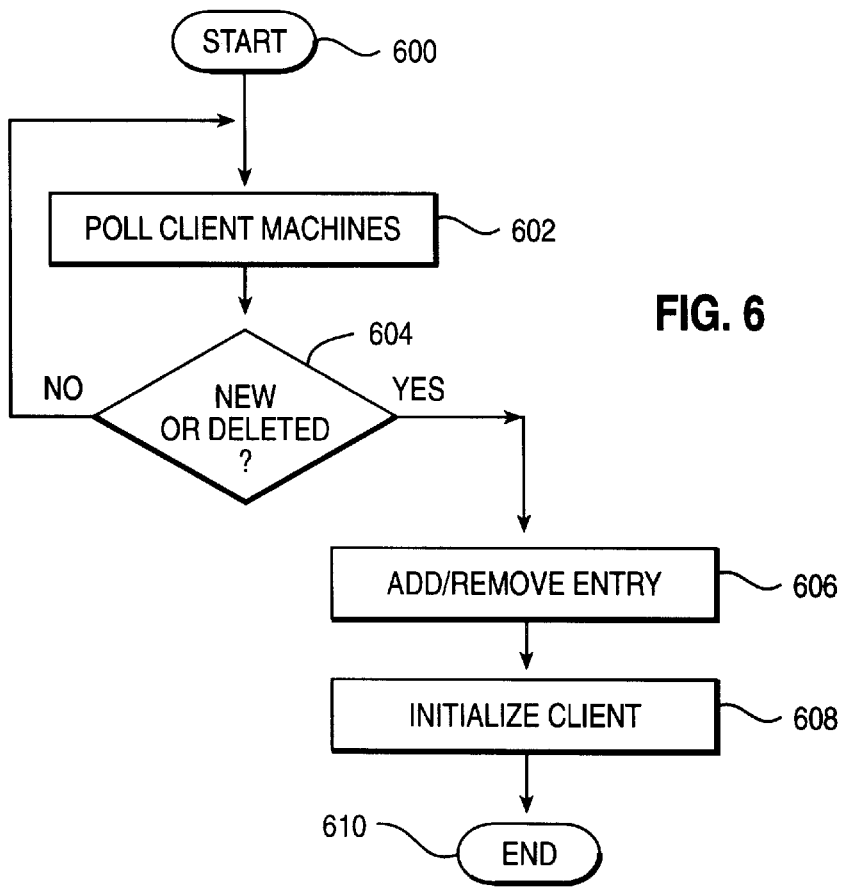
FIG. 5 is a diagram illustrating an example of how the client table of FIG. 3 can be used according to the teachings of the present invention.
FIG. 6 is a flow chart illustrating the operation of the detection software of FIG. 4 according to the teachings of the present invention.

Reference now being made to FIG. 6, a flow chart is shown illustrating the operation of the detection software 402c according to the teachings of the present invention.

The operation of the detection software begins at step 600 and proceeds to step 602 where the clients 404–408 of network 400 are pulled for the corresponding MAC address of their network adapter. The operation then proceeds to step 604 where based upon the MAC address the client table 302 is searched to determine whether or not the pulled MAC addresses exist therein, or if any MAC addresses existing in the client table 302 have not been detected.

If, at step 604, it is determined that either a new MAC address has been presented on the network 400 or an old MAC address recorded in the client table 302 no longer exists, then the operation proceeds to step 606. If, however, at step 604, neither a new MAC address has been detected or an existing MAC address in the client table is no longer present, then the operation proceeds back to 602.

At step 606, if a new MAC address has been presented on the network 400, then the MAC address and it's corresponding client machine 404–408 are entered into the client table 302 as previously discussed. If, however, at step 606, an existing MAC address in the client table 302 is no longer present on the network 400, then the exiting MAC address is deleted from client table 302. The operation then proceeds to step 608. It should be noted that if an entry is removed from the client table 302, then step 608 is unnecessary, and the operation proceeds to end at step 610.

At step 608, if a new MAC address has been presented on the network 400 the new client machine 404–408 is initialized using the profile 410 and templates 412 as previously discussed. The operation then proceeds to end at step 610.

What is claimed is:

1. In a network having a plurality of client machines, each client machine including a network adapter with a unique address, a method of automatically detecting the addition of a new client machine to the network, the method comprising the steps of:
   connecting a new client machine to the network, the new client machine having a network adapter with a new unique address;
   polling each of the client machines for the unique address of their network adapter;
   recording each of the detected unique addresses and the identification of each of the corresponding client machines; and
   determining that the new client machine has been added to the network via the presence of the new unique address of the network adapter of the new client machine, wherein the determining includes searching the recorded unique addresses for the new unique address of the network adapter of the new client machine.

2. The method of claim 1 wherein the step of determining further includes the step of:
   initializing, in response to not finding the new unique address in the recorded unique addresses, the new client machine to default parameters.

3. The method of claim 2 further comprising the steps of:
   creating a default profile having information related to the configuration of the network adapter of the new client machine; and
   creating a default template having information concerning directory structures for locations of files for the new client machine.

4. The method of claim 3 wherein the step of initializing includes the steps of:
   configuring the network adapter of the new client machine using the default profile; and
   initializing the new client machine to recognize locations of files using the default template.

5. The method of 4 wherein each of the existing network adapters and the network adapter of the new client machine are of the same type.

6. In a network having a plurality of client machines, each client machine including a network adapter with a unique address, an apparatus for automatically detecting the addition of a new client machine to the network, the apparatus comprising:
   means for connecting a new client machine to the network, the new client machine having a network adapter with a new unique address;
   means for polling each client machine for the unique address of their network adapter;
   means for recording each of the detected unique addresses and the identification of each of the corresponding client machines; and
   means for determining that the new client machine has been added to the network via the presence of the new unique address of the network adapter of the new client machine, wherein the means for determining includes means for searching the recorded unique addresses for the new unique address of the network adapter of the new client machine.

7. The apparatus of claim 6 wherein the means for determining further includes:
   means for initializing, in response to not finding the new unique address in the recorded unique addresses, the new client machine to default parameters.

8. The apparatus of claim 7 further comprising:
   means for creating a default profile having information related to the configuration of the network adapter of the new client machine; and
   means for creating a default template having information concerning directory structures for locations of files for the new client machine.

9. The apparatus of claim 8 wherein the means for initializing includes:
   means for configuring the network adapter of the new client machine using the default profile; and
   means for initializing the new client machine to recognize locations of files using the default template.

10. The apparatus of 9 wherein each of the existing network adapters and the network adapter of the new client machine are of the same type.

11. A computer program product comprising:
    a computer readable usable medium having computer readable program code means embodied in the medium for automatically detecting the addition of a new client machine to a network having a plurality of client machines, each client machine including a network adapter with a unique address, the computer readable program code means including:
    means for connecting a new client machine to the network, the new client machine having a network adapter with a new unique address;
    means for polling each client machine for the unique address of their network adapter;
    means for recording each of the detected unique addresses and the identification of each of the corresponding client machines; and
    means for determining that the new client machine has been added to the network via the presence of the new unique address of the network adapter of the new client machine, wherein the means for determining includes means for searching the recorded unique addresses for the new unique address of the network adapter of the new client machine.

12. The computer program product of claim 11 wherein the means for determining further includes:

means for initializing, in response to not finding the new unique address in the recorded unique addresses, the new client machine to default parameters.

13. The computer program product of claim 12 wherein the computer readable program code means further comprises:

means for creating a default profile having information related to the configuration of the network adapter of the new client machine; and means for creating a default template having information concerning directory structures for locations of files for the new client machine.

14. The computer program product of claim 13 wherein the means for initializing includes:

means for configuring the network adapter of the new client machine using the default profile; and means for initializing the new client machine to recognize locations of files using the default template.

15. The computer program product of 14 wherein each of the existing network adapters and the network adapter of the new client machine are of the same type.

* * * * *